United States Patent [19]

Clayton et al.

[11] Patent Number: 5,208,886
[45] Date of Patent: May 4, 1993

[54] METHODS OF MAKING AN OPTICAL FIBER FILTER

[75] Inventors: Jane B. Clayton, Suwanee; Calvin M. Miller, Atlanta; William A. Vicory, Duluth, all of Ga.

[73] Assignee: AT&T Bell Laboratories, Murray Hill, N.J.

[21] Appl. No.: 723,135

[22] Filed: Jun. 28, 1991

Related U.S. Application Data

[62] Division of Ser. No. 466,536, Jan. 17, 1990.

[51] Int. Cl.⁵ .............................................. G02B 6/38
[52] U.S. Cl. ...................................... 385/73; 359/900
[58] Field of Search .................... 385/73, 74, 134, 140; 359/890, 900

[56] References Cited

U.S. PATENT DOCUMENTS

| | | | |
|---|---|---|---|
| 4,258,571 | 8/1981 | Winzer | 350/96.21 |
| 4,383,732 | 5/1983 | Dalgoutte et al. | 350/96.2 |
| 4,621,895 | 11/1986 | Motsko | 385/73 |
| 4,712,862 | 12/1987 | Lightstone | 385/73 |
| 4,830,451 | 5/1989 | Stone | 350/96.15 |
| 4,848,999 | 8/1989 | Taylor | 65/4.3 |
| 4,861,136 | 8/1989 | Stone et al. | 350/96.3 |

FOREIGN PATENT DOCUMENTS

| | | | |
|---|---|---|---|
| 0075704 | 4/1983 | European Pat. Off. | 350/96.15 |
| 57-168126 | 10/1982 | Japan . | |
| 2138161 | 10/1984 | United Kingdom | 350/96.2 |
| 2190187 | 11/1987 | United Kingdom . | |

OTHER PUBLICATIONS

IEEE Journal Quantum Electronics, vol. QI-17, No. 11 Nov. 1981, pp. 2168-2170, S. T. Petuchowski, et al., "A Sensitive Fiber-Optic Fabry-Perot Interfometer".
Electronics Letters, vol. 21, No. 11 May 23, 1985, pp. 504-505, J. Stone, "Optical-Fiber Fabry-Perot Interferometer With Finesse of 300".
Electronics Letters, Jul. 16, 1987, vol. 23 No. 14 pp. 781-783, J. Stone and L. W. Stulz, "Pigtailed High-Finesse Tunable Fibre Fabry-Perot Interferometers With Large, Medium and Small Free Spectral Ranges".
Electronics Letters, Jan. 29, 1987, pp. 98-99, B. Glance, et al., "Fast Frequency-Tunable External Cavity Laser".
Electronics Letters, vol. 23, No. 21, Oct. 8, 1987, I. P. Kaminow, et al., "FDM-FSK Star Network with a Tunable Optical Filter Demutiplexer".
D. Marcuse, et al., "Coupling Efficiency of Front Surface and Multilayer Mirrors as Fiber-End Reflectors" Journal of Lightwave Technology, vol. LT-4, No. 4 Apr. 1986, pp. 377-381.
T. Khono, et al. "A Balloon Borne Fabry-Perot Interference Spectrometer", Optics Communication, vol. 17 No. 3, Jun. 1976, pp. 297-301.
D. L. Franzen et al., "Long Optical-Fiber Fabry-Perot Interferometers", Applied Optics, vol. 20 No. 23, Dec. 1, 1981 pp. 3991-3992.
S. Mallinson, "Wavelength-Selective Filters for Single-Mode WDM Systems Using Fabry-Perot Interferometers", Applied Optics, vol. 26 No. 3, Feb. 1, 1987, pp. 430-436.
W. Tuma et al, "Control of Mirror Position in a High Precision Interferometer", Journal of Physical E. Scientific Instruments, 1973, pp. 169-170.

Primary Examiner—Brian Healy
Assistant Examiner—John Ngo
Attorney, Agent, or Firm—E. W. Somers; D. E. Hayes

[57] ABSTRACT

A low loss, tunable optical filter (20) comprises two ferrules (24-24) which are aligned axially with each of two adjacent end faces being provided with a wafer (30). A mirror (40) is embedded between each end face and its associated wafer, the wafer being bonded to the end face of its associated wafer. Optical fiber is disposed in a passageway which extends through each ferrule and through the associated wafer. The ferrules and associated wafers are supported to cause adjacent exposed faces of the wafers to be in predetermined spatial relation to each other. Any gap therebetween may be fixed or may be adjusted by a piezoelectric transducer system (44). The disclosed filter provides rejection ratios which are sufficiently high for frequency discrimination in frequency shift keying systems and for channel selection or switching in wave division multiplexer applications.

10 Claims, 4 Drawing Sheets

FIG. 10     FIG. 11     FIG. 12

METHODS OF MAKING AN OPTICAL FIBER FILTER

This is a division of application Ser. No. 07/466,536 filed Jan. 17, 1990 now U.S. Pat. No. 5,062,684.

TECHNICAL FIELD

This invention relates to methods of making an optical fiber filter. More particularly, the invention relates to methods of making an optical fiber filter which is tunable over a desired range to provide a desired bandwidth.

BACKGROUND OF THE INVENTION

The economic advantages of transmitting information in the form of optical signals have been realized in commercial systems. In currently used optical transmission systems, the optical signals are converted to electronic ones before processing occurs. Such processing involves the use of standard electronic devices.

Designs for future optical communication systems go beyond the simple transmission of information on an optical carrier, and include the processing of signals while still in optical form. In the next generation of optical communication systems, it is envisioned that optical signals will be processed without conversion to electronic signals. Such optical processing will require optical devices which are analogous to those devices, such as amplifiers, modulators, filters, multiplexers, demultiplexers, for example, which are used for processing electronic signals.

An easily manufacturable optical filter having a bandwidth between about 100 MHz and a few tens of gigahertz with low insertion loss would be an important component in wavelength multiplexing as well as in many other applications. It appears that the most promising approach to such a device is a fiber Fabry-Perot interferometer which may be referred to as an FFP.

A Fabry-Perot interferometer is an optical device which can be used to process optical signals and includes two mirrors with a cavity therebetween. The Fabry-Perot interferometer is discussed in most of the classic texts and its operation is well understood. See, for example, Born & Wolf, *Principles of Optics*, MacMillan, 1959, pages 322-332. An exemplary Fabry-Perot structure comprises a region bounded by two plane, parallel mirrors. The structure exhibits low loss, that is, it passes only particular wavelengths, for which the cavity is said to be in resonance-a condition obtained by adjusting appropriately the cavity parameters. At resonance, the cavity passes a series of approximately equally spaced wavelengths. The spacing between these wavelengths, called the free spectral range (FSR) or tuning range of the cavity, is a function of the spacing between the mirrors and the index of refraction of the medium between the mirrors. The tuning range of a Fabry-Perot interferometer is equal to $c/2nl_c$ where $l_c$ is used to designate the length of the cavity. Accordingly, the shorter the cavity, the larger the tuning range. The bandwidth is largely determined by the reflectivity of the mirrors; however, other sources of loss and reflections can affect bandwidth. Another parameter which is designated finesse (F) is equal to the quotient of the tuning range divided by the bandwidth.

The use of Fabry-Perot cavities as filters, for example, to process optical signals is well known. However, the application of such devices to the processing of optical signals in commercial optical fiber communication systems has been hampered by, among other constraints, the lack of practical designs which have suitable characteristics, such as low loss when used with optical fibers and appropriate values of free spectral range. Nevertheless designs that more closely meet the needs of a commercial fiber system have been suggested. For example, in *Electronics Letters*, Vol. 21, No.11, pp. 504-505 (May 23, 1985), J. Stone discussed a fiber Fabry-Perot interferometer design in which the cavity was an optical fiber waveguide with mirrored ends. The free spectral range of the resulting cavity is determined by the length of the fiber segment. Accordingly different free spectral ranges can be obtained by using fiber segments of different lengths. The cavity can be tuned over one free spectral range by changing the cavity optical length by one-half the wavelength value of the light entering the cavity. In this way, the cavity can be tuned to resonate at, and therefore transmit light of different wavelength values. To obtain such tuning, the cavity length can be changed, for example, by means of a piezoelectric element attached to the fiber, which, when activated, will stretch the fiber and increase the associated cavity optical length accordingly. Fiber Fabry-Perot interferometers can be made with a finesse up to a value of 500 with relatively low insertion loss, using separately attached mirrors.

In an article entitled "Pigtailed High-Finesse Tunable Fiber Fabry-Perot Interferometers With Large, Medium and Small Free Spectral Ranges", authored by J. Stone and L. W. Stulz, appearing in the Jul. 16, 1987 issue of *Electronics Letters* beginning at page 781, the authors demonstrated that fiber Fabry-Perot interferometer devices with any required bandwidths can be fabricated from one of three types of structures reported in that article. Tuning is accomplished by stretching the fiber.

A so-called Type 1 structure reported in the above-identified article by Stone and Stulz is a fiber resonator. Mirrors are deposited on both ends of a continuous fiber and tuning is achieved by changing the optical length of the fiber. This type of fiber Fabry-Perot interferometer generally is limited to a length greater than 1 to 2 cm which equates to a free spectral range on the order of 10 to 5 $GH_z$. Although no alignment is required inside the cavity, the bandwidth range is limited to less than 100 MHz for a finesse of 100 and an $l_c$ of 1 cm.

Among the advantages of the Type 1 Fabry-Perot interferometer is the fact that the cavity comprises an optical fiber which is a waveguide. This eliminates deleterious diffraction effects present in long Fabry-Perot cavities which are not waveguides. The elimination of the deleterious diffraction effects is associated with the guiding characteristics of the fiber. However, the difficulty of working with and stretching small lengths of optical fiber precludes large values of free spectral range when using a Type 1 Fabry-Perot. As a result, the usefulness of the Type 1 Fabry-Perot design is somewhat limited.

A Type 2 fiber Fabry-Perot inteferometer is a gap resonator with mirrors deposited on adjacent end faces of two optical fibers. In this type of filter, the defraction loss between the fibers limits the resonator gap to less than 10 $\mu$m which corresponds to a free spectral range greater than 10,000 $GH_z$.

Large free spectral ranges can be obtained by using a Type 2 Fabry-Perot interferometer in which the cavity comprises a small gap. However, because of diffraction losses, wider gap cavities are less practical. and therefore the Type 2 Fabry-Perot interferometer is not adequate for applications which require the smaller free spectral ranges otherwise associated with larger gaps. Unacceptable losses result from gaps in excess of 10 μm.

A Type 3 structure reported on by Stone and Stulz is an internal waveguide resonator. A mirror film is applied to an end of one external fiber disposed in the passageway of a glass or ceramic ferrule and another to one end of an internal waveguide. The ferrule which supports the external fiber is movably mounted in a sleeve in which also is disposed the internal waveguide and another ferrule in which an optical fiber is disposed. A relatively small gap separates the mirrored end of the external waveguide and an unmirrored end of the internal waveguide. Scanning is accomplished by changing the spacing of the small gap between the mirror film at the end of the external fiber and the internal waveguide. The free spectral range is determined by the length of the internal waveguide which can be as short as 1 mm or less. An anti-reflection coating may be applied to the non-mirrored end of the internal waveguide. Although the Type 3 fiber Fabry-Perot interferometer covers the most practical range of frequencies, it may be somewhat difficult to manufacture because of the lengths of the internal waveguide.

In each of the above-described three types of Fabry-Perot interferometers, the fiber ends are disposed in glass or ceramic ST® connector ferrules. Afterwards, the ends are polished and coated with multi-layer dielectric mirrors. The ferrules are held in alignment with either a split zirconia sleeve or a solid zirconia sleeve and the assembly is mounted in a piezoelectric shell which is attached such as, for example, with an epoxy material to the ferrules. Should a fiber connection be needed, it may be carried out by connecting ST or rotary splice connectors to the outer ferrule ends for the Type 1 or to fiber pigtails for Types 2 or 3.

Other techniques are known to minimize diffraction losses in large gap cavities, such as the use of expanded beams or concave mirrors which keep the beam confined by refocusing. However, those techniques involve arrangements which are difficult to implement with optical fibers.

The problem is to obtain a very sharp narrow band optical filter with cavity lengths that span from a few microns to several millimeters which correspond to bandwidths between a few tens of gigahertz and approximately 100 MHz with a stable repeatable design that is relatively easy to manufacture with high yield. Also the sought after device is an optical filter which is tunable and has low loss. Still further, the sought after optical filter has a relatively high extinction or contrast ratio, that is, one which has a large difference between the passband and the stopband insertion loss.

SUMMARY OF THE INVENTION

The foregoing problems of the prior art have been overcome by the optical filter of this invention. In this invention, the sought after optical filter has been achieved by a resonant cavity approach to obtain the sharp filtering desired. In order to obtain a desired tuning range and bandwidth, the cavity length may range between a few microns and several millimeters.

An optical filter which is capable of having a desired bandwidth comprises a first ferrule assembly having aligned passageway portions for receiving optical fiber. The passageway portions are spaced apart by a mirror which is normal to a longitudinal axis of the passageway portions, and which is substantially closer to one end of the first ferrule assembly than to an opposite end thereof. A second ferrule assembly has aligned passageway portions for receiving optical fiber. The passageway portions in the second ferrule assembly are spaced apart by a mirror which is normal to a longitudinal axis of the passageway portions in the second ferrule assembly and which is substantially closer to one end of the second ferrule assembly than to an opposite end thereof. Optical fiber is positioned in each passageway portion of each ferrule assembly. Also included is means for holding the first and second ferrule assemblies with the axes of the passageways aligned and with the one end of said first ferrule assembly being adjacent to the one end of said second ferrule assembly and for causing the adjacent one ends of the ferrule assemblies to have a predetermined axial spacing. The mirrors of the ferrule assemblies extend over only a portion of the transverse cross-sectional area of the associated ferrule.

Each ferrule assembly of the filter includes a multi-layer mirror coating being disposed on an end of a wafer and having a reflectivity of about 95-99%. The wafer is bonded to an end surface of a first ferrule to provide a first ferrule assembly with the mirror abutting the end surface of the first ferrule. Each ferrule and each wafer has a passageway extending therethrough with optical fiber being received in each passageway. The wafer and ferrule are bonded together to cause the passageways to be aligned. Then a second ferrule assembly is positioned to cause the passageways of the two ferrule assemblies to be aligned longitudinally and to cause exposed end surfaces of the wafers to be adjacent to each other. A mirror coating is not applied over the entire surface of each wafer end because mirror surfaces are not conducive to bonding.

In the preparation of the filter in the preferred embodiment, two ferrules each having a passageway therethrough with optical fiber disposed therein and one of which has a mirror formed on one of the end faces thereof are aligned using an active alignment process by measuring power and then are bonded together with the mirror therebetween. Then one of the ferrules is severed to provide a wafer having a newly formed end surface which is polished. Two such wafered ferrules are positioned with the passageways aligned and with the mirrors being adjacent to each other. With such a construction, only a few percent of the light at a non-resonant wavelength is passed through each mirror. At a particular wavelength, when the cavity length is a multiple, m, of λ/2, a resonant peak is obtained. All reflections in the resonant cavity add in phase and a relatively low throughput loss is achieved.

By changing the cavity length, that is, the distance between the mirrors, tuning capability is provided. Only a small change in cavity length allows the peaks to be shifted to any frequency within the tuning range. If the cavity length is changed by one half of a wavelength, the peaks are shifted through one FSR. For example, the fiber Fabry-Perot interferometer can be mounted on a bracket with piezoelectric crystals, which comprise a transducer system. A voltage is impressed on the transducer system that causes the cavity to be expanded or contracted. Hence, the filter not only provides peaks which are extremely sharp, but, also, the filter may be rendered tunable.

BRIEF DESCRIPTION OF THE DRAWING

Other features of the present invention will be more readily understood from the following detailed description of specific embodiments thereof when read in conjunction with the accompanying drawings, in which:

FIG. 10 depicts an enlarged view of a mirror arrangement of the preferred embodiment; and FIGS. 11 and 12 depict alternate mirror arrangements for the filters made by the methods of of this invention.

DETAILED DESCRIPTION

Figure 1:
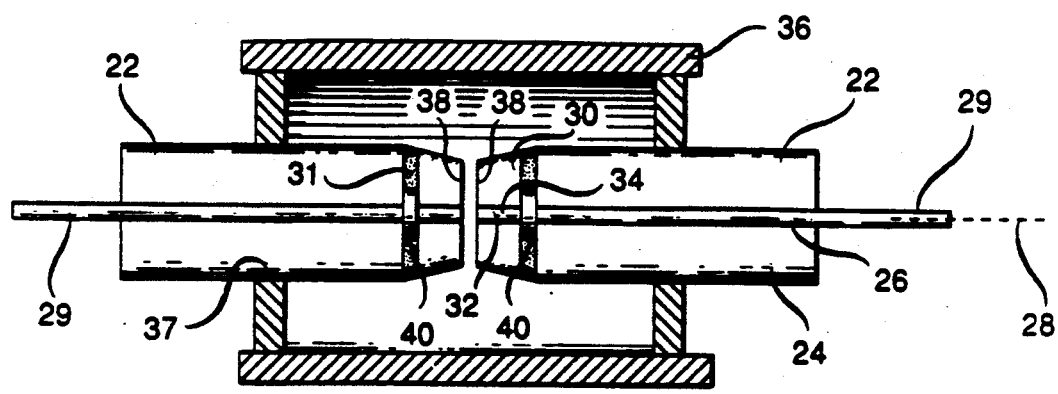
FIG. 1 is a schematic view of an optical fiber filter made by the methods of this invention.

Referring now to FIG. 1, there is shown an optical filter of this invention which is designated generally by the numeral 20. The filter 20 comprises two ferrule assemblies each of which is designated generally by the numeral 22.

Each ferrule assembly 22 includes a cylindrically shaped ferrule 24 which has a passageway 26 extending along a longitudinal axis 28 thereof. In a preferred embodiment, the ferrule 24 is made of Pyrex ® glass and is about 1 to 2 cm in length. An optical fiber 29 is disposed in the passageway 26 of the ferrule assembly. The optical fiber 29 extends beyond an end of the ferrule 24 to facilitate connection to other devices or fiber.

Each ferrule assembly 22 also includes a wafer 30 which is attached by an adhesive material 31 to one end of the ferrule 24. The wafer 30 also includes a passageway 32 which is aligned with the passageway 26 of the associated ferrule 24. Disposed in the passageway 32 of the wafer 30 is a length of optical fiber 34. Interposed between an outer surface of the wafer 30 and the ferrule 24 of each ferrule assembly 22 is a mirror 40.

The mirror 40 is comprised of alternating material layers at least one of which is a dielectric material. The mirror may comprise alternating layers of two different dielectric materials such as, for example, titanium dioxide and silicon dioxide. Or, the mirror may comprise alternating layers of a metallic material and/or a dielectric material. In a preferred embodiment, the mirror is comprised of alternating layers of silicon and silicon dioxide.

As can be seen in FIG. 1, the two ferrule assemblies are mounted in a support 36 to cause the passageways of the ferrule assemblies to be aligned. Each ferrule assembly 24 extends through a close fitting opening 37. In order to facilitate entry of a ferrule assembly into an opening 37, an end portion of the ferrule assembly 22 is beveled.

Figure 2:
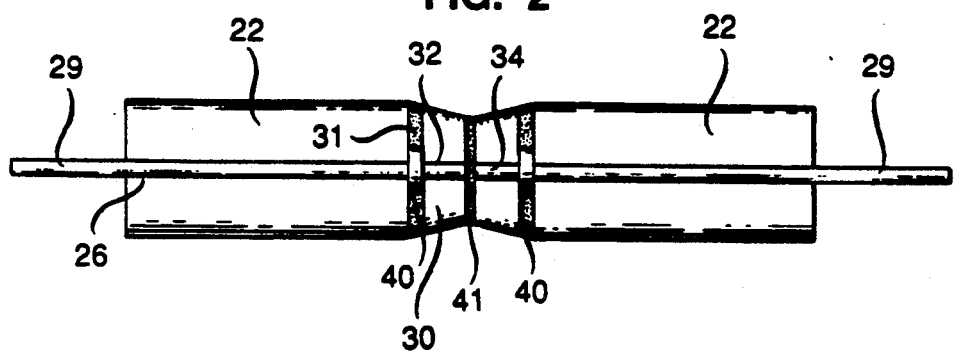
FIG. 2 is a schematic view made by the methods of of a simplified optical fiber filter of this invention.

Further, the ferrule assemblies 22—22 are supported to cause exposed end faces 38—38 of the wafers 30—30 to be spaced a predetermined distance apart. In another embodiment which is shown in FIG. 2, an ultraviolet light curable adhesive material 41 is caused to be disposed between end faces of the wafers 30—30, the distance between the end faces of the wafers adjusted and the adhesive material cured. The result is a fixed frequency filter.

Because the ferrule assemblies 22—22 in the above-described embodiments are fixed in position spaced a predetermined distance apart, the filter functions to pass only desired frequencies. In other words, the filter is pretuned.

Figure 3:
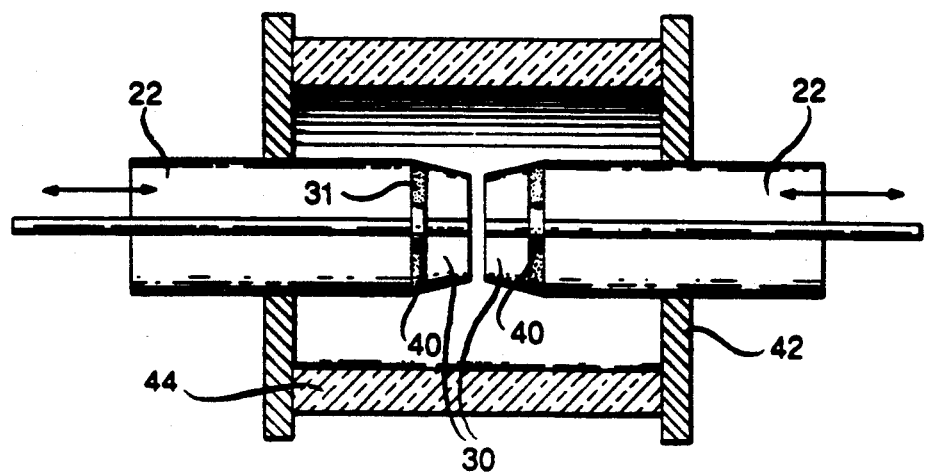
FIG. 3 is a schematic view of a tunable optical filter made by the methods of of this invention.

In FIG. 3 is shown the optical filter of FIG. 1 but with a different support arrangement. The ferrule assemblies 22—22 are mounted in a support 42 to allow the ferrule assemblies to be movable with respect to each other in a direction along the aligned longitudinal axes. The movement may be accomplished by use of a piezolectric transducer system 44 which may be operated to control the spacing between the exposed end faces of the wafers 30—30.

Figure 4:
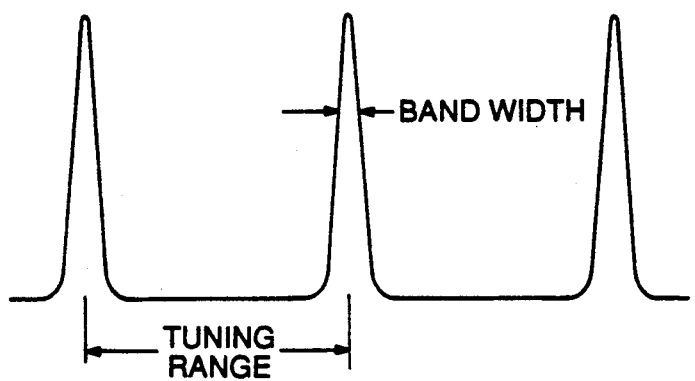
FIG. 4 depicts a frequency plot which is achieved with the optical fiber filter made by the methods of of this invention.

The optical filter made by the methods of this invention may be used when it is desired to select a narrow band of wavelengths (see FIG. 4) such as, for example, for a frequency discriminator in a frequency shift keying (FSK) system. In order to use a Fabry-Perot interferometer in an FSK system, it is desired to have a bandwidth of approximately 10 $GH_z$ and a tuning range of greater than 500 $GH_z$. Currently in use is amplitude shift keying in which a laser (not shown) is turned on to send a 1 and nearly off to send a 0. The problem with amplitude shift keying is that when current changes dramatically, the laser changes frequency, which is referred to as chirp. This is undesirable because dispersion in fiber is wavelength dependent, which unduly limits the system. Although non-chirp frequency lasers which will not change frequency at drive surges may be used, they are expensive.

For frequency shift keying, chirping is desired. The drive current is reduced, so that for a 0 signal, 95%, for example, is sent to the laser and for a 1, 100% is sent. It is desired to have a wavelength change, a chirp. The light output does not change significantly; however, the frequency still changes a small amount. Therefore, a zero is sent at one frequency and a one at another slightly different frequency. One frequency domain spectrum is obtained for a zero and another for a one separated by as little as a few gigahertz. With a fiber Fabry-Perot interferometer centered over the ones, for example, zeros are not passed through, but ones are because they occur at wavelengths where the fiber Fabry-Perot interferometer has maximum transmission. By filtering out the zeros with the fiber Fabry-Perot interferometer, the system can be used with receivers as before and large changes in the drive current to the laser can be reduced. The frequency discriminator effectively discriminates against zeros. As a result, the system can run faster with an increased bit rate with less expensive lasers and less expensive electronic drive circuitry.

A similar application of the optical filter made by the methods of this invention is in an AM system where the laser is operated in an FM mode as previously described and the filter is placed at the transmitter end with appropriate isolators between. The filter now removes, for example, the frequency of the zeros so that only frequencies corresponding to ones remain. This external modulator application would reduce dispersion problems because only a narrow band of frequencies is present.

Further utility is shown when there are a plurality of channels at different wavelengths. A splitter is introduced and each fiber Fabry-Perot filter is tuned to one wavelength which is different from the others. The result is a relatively inexpensive wave division multiplexer. If all the wavelengths are introduced into a single fiber Fabry-Perot filter, it is possible to extract any one wavelength. In effect, the arrangement functions as an optical tuner allowing the selection of any channel.

The filter passes a band of wavelengths depending on the bandwidth of the filter. If four more such channels were spaced within the free spectral range of the Fabry-Perot, the filter could be tuned to pass a desired channel to its output and reflect those channels which are not passed. If the passband of the Fabry-Perot is made sufficiently narrow, the filter also could discriminate between zeros and ones in an FSK system.

In the manufacture of a fiber Fabry-Perot interferometer in accordance with the methods of this invention, an end portion of optical fiber is 29 inserted into the passageway 26 within a first cylindrically shaped ferrule 24 or capillary tube as it is often called (see FIG. 5) and an end portion of optical fiber 34 into a passageway within a second ferrule 24'. Then, an end face of each ferrule is ground and polished.

Figure 5:
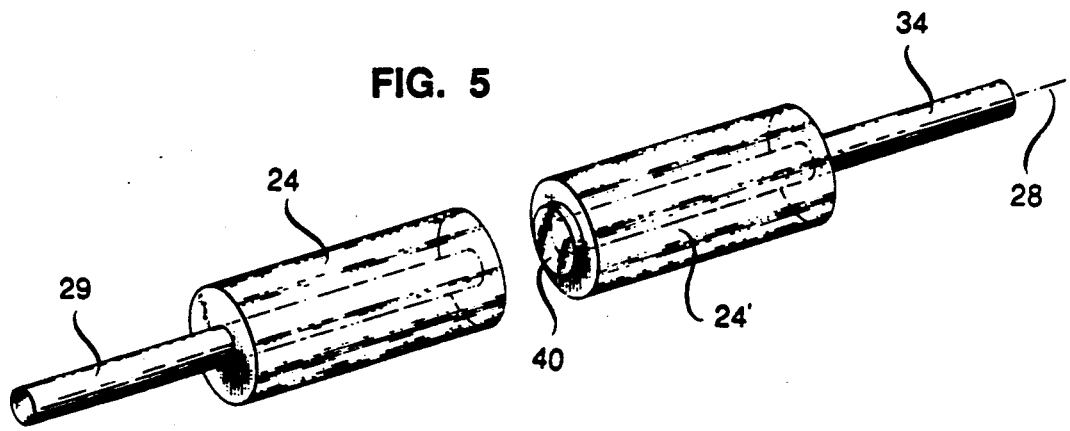
FIG. 5 depicts initial steps of a method of making the optical fiber filter of FIG. 1.

Subsequently, a portion of the end surface of the second one of the ferrules, the ferrule 24', is provided with a mirror 40 (see again FIG. 5). The mirror is such that it has a relatively high reflectivity, i.e. on the order of 95 to 99%. Preferably, it is a multilayer mirror with alternating layers of silicon and silicon dioxide used to form the mirror. Preferably, the number of layers is small to minimize diffraction. The mirror is important because the quality of this device is directly related to the quality of the mirror. Also, it should be observed from FIG. 5 that the mirror 40 covers only a portion of the end surface of the ferrule 24'.

Figure 6:
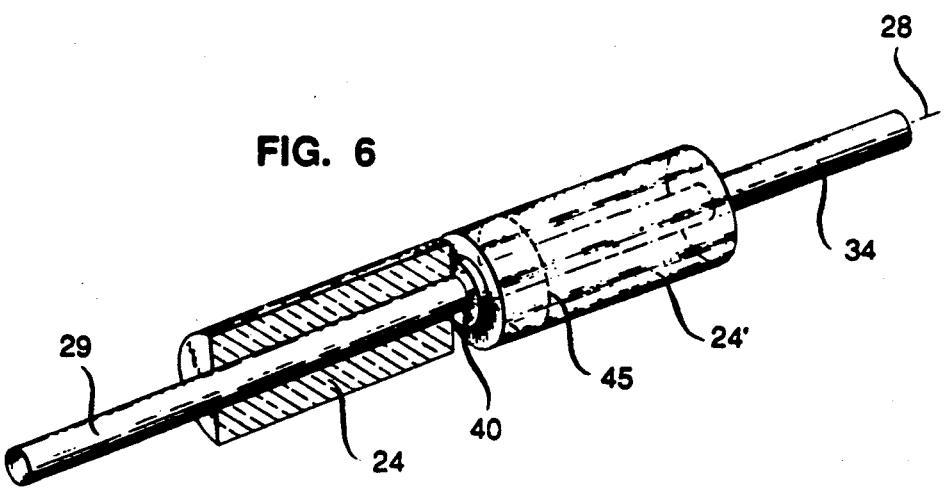
FIGS. 6 and 7 depict the subsequent steps in the method of making the optical fiber filter of FIG. 1.
Figure 7:
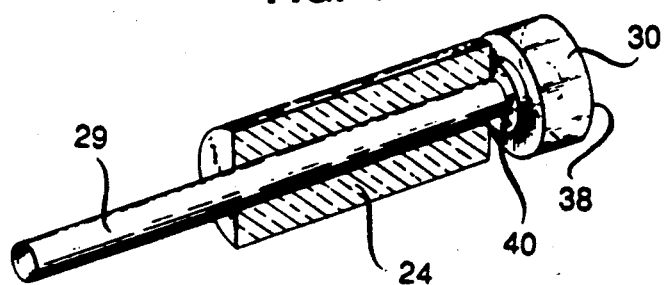

After the end surface of the second one of the two ferrules is provided with a mirror, the two ferrules are positioned to align the optical fibers within the passageways. Once aligned, the ferrule end surfaces are bonded together with the adhesive material 31 such that the end surface of one is bonded to the end surface of the other (see FIG. 6). Preferably, an ultraviolet light curable epoxy adhesive is used. Because a mirror is formed over only a part of the end surface of the ferrule 24', there is sufficient area over which to bond the one ferrule 24 to the other, mirrored ferrule 24'. Then the assembly of two ferrules, one mirrored, is severed by cutting along a line 45 through the mirrored ferrule 24' along a plane which is normal to the longitudinal centerline axis 28 of the ferrule and at a relatively short distance from the mirror to provide a portion which has been referred to hereinbefore as a wafer and which has the new end surface 38 (see FIG. 7 and also FIG. 1). Afterwards, an end portion of the wafered end of the ferrule assembly is beveled.

The foregoing operations are repeated with another two ferrules. each having an optical fiber disposed in a passageway of each.

Afterwards, the two ferrule assemblies 22—22 are mounted in the support 36 such that the two newly formed end surfaces 38—38 are disposed adjacent to each other. The distance between the newly formed end surfaces 38—38 can be anywhere from about zero to about a few microns. The distance between each mirror and its associated end face can be as small as about 10 microns. Provided by the just-described structure is a fixed wavelength optical filter.

As will be recalled, the optical filter made by the methods of of this invention also may be tunable. For the tunable embodiment of FIG. 3, interconnecting two ends of the supports on each side of the two aligned portions is the piezoelectric transducer system 44. The piezoelectric transducer system provides the fiber Fabry-Perot interferometer with the capability of being tuned. By impressing a voltage on the transducer system, the width of the gap between the newly formed end faces 38—38 of the wafers 30—30 can be changed. The higher the voltage which is impressed across the transducer system, the wider the gap between the two adjacent newly formed end surfaces.

Figure 8:
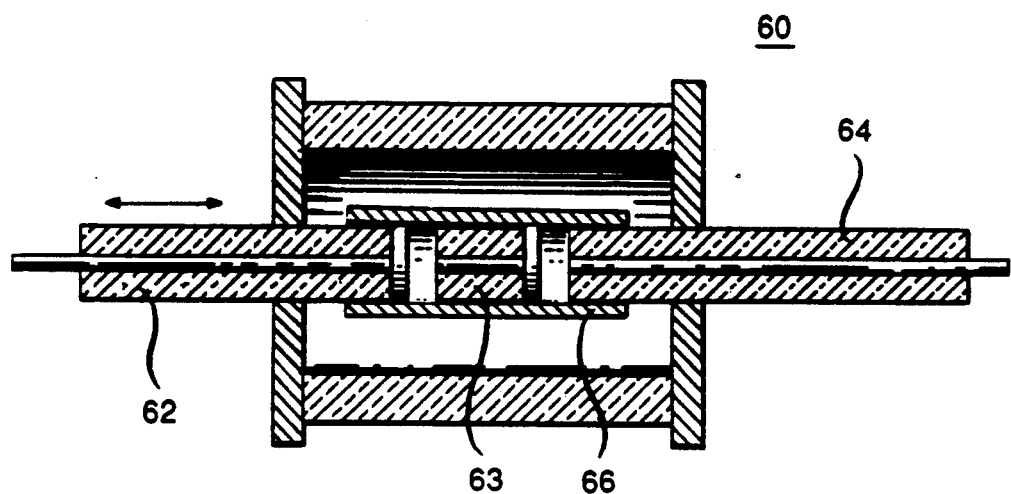
FIG. 8 is a schematic view of a prior art optical filter.
Figure 8:
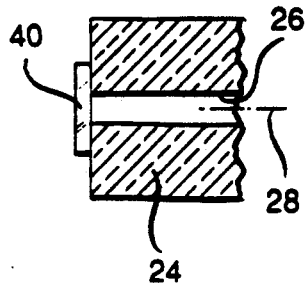
Figure 8:
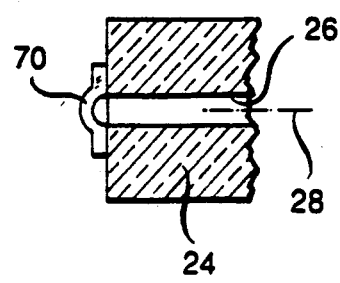
Figure 8:
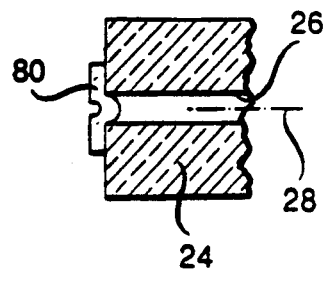
Figure 9:
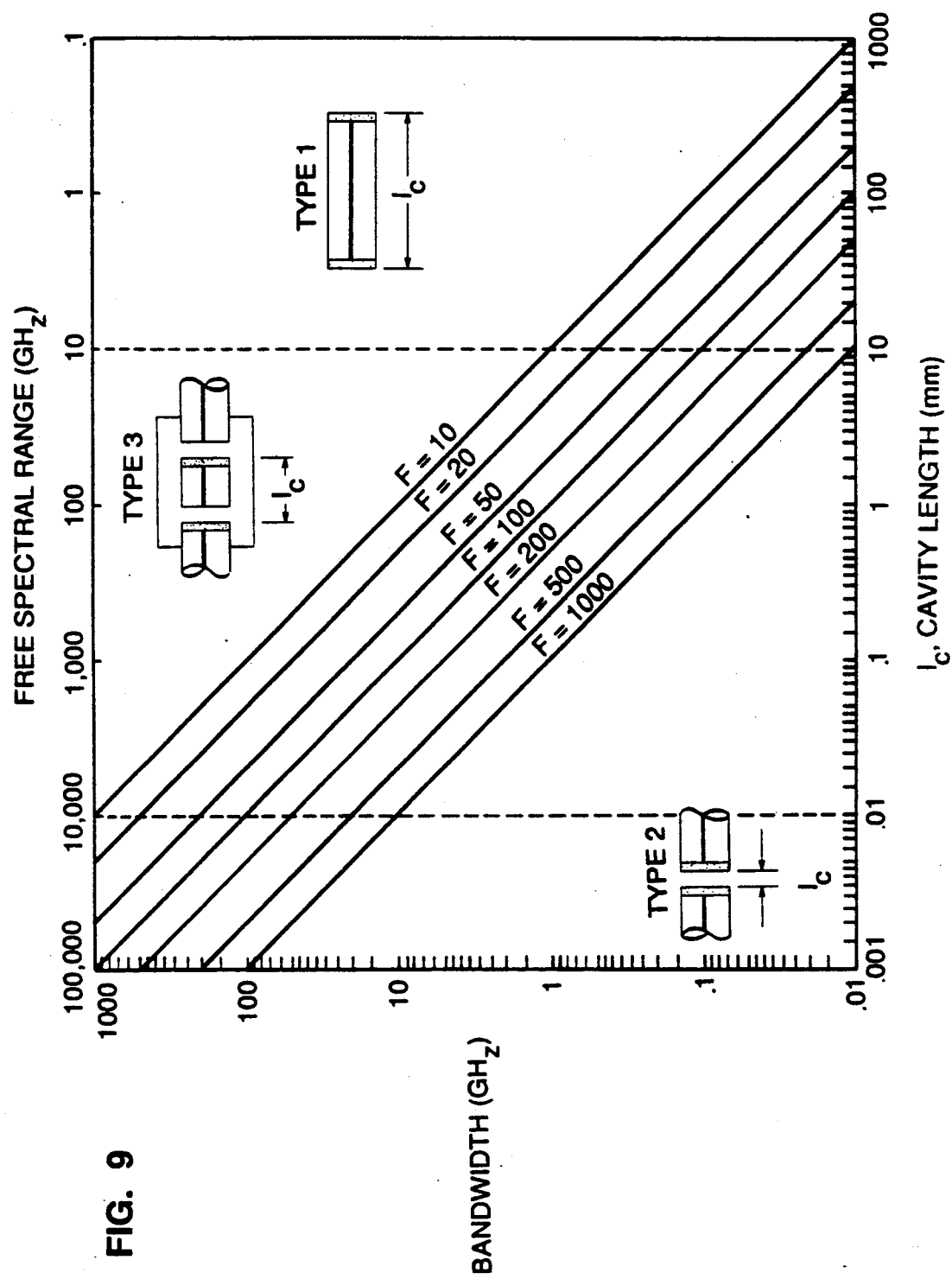
FIG. 9 is a graph which shows bandwidth as a function of finesse for various cavity lengths.

The arrangement made by the methods of of this invention differs from a Type 3 fiber Fabry-Perot interferometer 60 (see FIG. 8) disclosed in the above-identified article by Stone and Stulz. This invention makes the Type 3 fiber Fabry-Perot interferometer discussed in the hereinbefore identified Stone-Stulz article more manufacturable. Referring to the graph shown in FIG. 9, it can be seen that as the cavity length increases beyond 10 mm, it is necessary to use a Type 1 fiber Fabry-Perot interferometer whereas up to 10 $\mu$m, a Type 2 can be used. Bandwidth is plotted against finesse, and at 10 $GH_z$, a Type 3 Fabry-Perot interferometer is required. Types 1, 2 and 3 fiber Fabry-Perot interferometers were discussed hereinbefore under Background of the Invention. The prior art Type 3 design (see again FIG. 8) includes three components, an external waveguide 62, an internal waveguide 63 and a fixed waveguide 64, with a sleeve 66 for aligning the three components. The internal segment is fixed in position with respect to the fixed waveguide 64 using the sleeve 66 for alignment. The external waveguide ferrule 62 is movable with respect to the internal waveguide 63. Internal segments shorter than about a millimeter were impractical to handle separately. In the interferometer of the present invention, mirrored ferrules are aligned and bonded to unmirrored ferrules and subsequently cut, ground and polished to produce a wafered ferrule. Alignment is accomplished with XYZ positioners (not shown) which can achieve extremely accurate alignment and wafer thicknesses of only a few microns can be achieved as compared to a millimeter or so in the prior art.

The fiber Fabry-Perot interferometer made by the methods of of this invention has other advantages over those of the prior art. In the interferometer of this invention, there exists a dual wafer construction with both mirrors embedded in glass. This has been accomplished by causing a wafer to be bonded to a ferrule and by causing each mirror of the interferometer to be embedded at the interface between the wafer and the ferrule. Further, unlike the prior art, each mirror in the filter of this invention covers only a portion of the transverse cross sectional area of the interface between the wafer and the ferrule. In this way, the remainder of the cross-sectional area is used to facilitate bonding between the wafer and the ferrule. Further, by embedding the mirror, the mirror is protected against inadvertent damage. In the prior art design, the mirrors were exposed and subject to damage.

An antireflective coating may be disposed on each of the newly formed end faces 38—38 of the wafers 30—30. The antireflective coating prevents reflections from occurring and therefore prevents alteration of the finesse of a given mirror.

Although the preferred and other embodiments described hereinbefore have shown the mirror 40 formed on an end of a ferrule as being planar (see FIG. 10) and normal at every point thereon to a longitudinal axis of the ferrule, other structure is within the scope of this invention. For example, as is seen in FIGS. 11 and 12, mirrors 70 and 80 may be formed on ends of ferrules with center portions thereof being formed convexly outward or concavely inward, respectively.

It is to be understood that the above-described arrangements are simply illustrative of the invention. Other arrangements may be devised by those skilled in the art which will embody the principles of the invention and fall within the spirit and scope thereof.

We claim:

1. A method of making an optical filter, said method comprising the steps of:

providing first and second pairs of ferrules each of which includes a longitudinal extending passageway and a longitudinal axis;

causing an optical fiber to be disposed in the passageway of each ferrule;

causing a mirror to be formed on an end surface of one ferrule of each pair such that the mirror covers the passageway which opens to the end surface;

positioning the other ferrule of each pair with the one ferrule of said each pair to cause the passageways to be aligned and to cause an end surface of the other ferrule to abut the mirror on the end surface of the one ferrule;

causing the other ferrule of each pair to become attached to the one ferrule of each pair in the aligned position to provide a ferrule assembly;

severing the one ferrule of each pair in a plane normal to the longitudinal axes of the ferrules at a distance from the mirror which is small relative to the length of the ferrule to provide a wafer having a newly formed end surface; and positioning the ferrule assemblies to align the passageways and to cause the spacing between the newly formed end surfaces of the wafers to be a predetermined value.

2. The method of claim 1, wherein the step of causing a mirror to be formed is accomplished to cause the mirror to cover only a portion of the transverse cross sectional area of each said one ferrule.

3. The method of claim 2, wherein, the step of attaching the other ferrule to the one ferrule of each pair is accomplished by means of an adhesive material.

4. The method of claim 3, wherein each said mirror has a reflectivity in the range of about 95 to 99% and comprises alternating layers of a metal and a dielectric material.

5. The method of claim 4, wherein each said mirror comprises alternating layers of silicon and silicon dioxide.

6. A method of making a tunable optical filter which comprises the steps set forth in claim 1 and which comprises the further step of mounting said ferrule assemblies for relative movement therebetween along the longitudinal axes and providing means for causing relative movement between said ferrule assemblies to cause the spacing between the newly formed end surfaces of the wafers to be a predetermined value.

7. The method of claim 6, wherein a portion of each ferrule assembly is supported with a piezoelectric transducer system disposed thereabout.

8. A method of making an optical assembly which is capable of being used in an optical filter, said method comprising the steps of:

providing a pair of ferrules each of which includes a longitudinal extending passageway and a longitudinal axis;

causing an optical fiber to be disposed in the passageway of each ferrule;

causing a mirror to be formed on an end surface of one ferrule of the pair such that the mirror covers the passageway which opens to the end surface;

positioning the other ferrule of the pair with the one ferrule of the pair to cause the passageways to be aligned and to cause an end surface of the other ferrule to abut the mirror on the end surface of the one ferrule;

causing the other ferrule of each pair to become attached to the one ferrule of the pair in the aligned position to provide a ferrule assembly; and severing the one ferrule of the pair in a plane normal to the longitudinal axes of the ferrules at a distance from the mirror which is small relative to the length of the ferrule to provide a wafer having a newly formed end surface.

9. The method of claim 8, wherein the step of causing a mirror to be formed is accomplished to cause the mirror to cover only a portion of the transverse cross sectional area of said one ferrule.

10. The method of claim 9, wherein said mirror has a reflectivity in the range of about 95 to 99% and comprises alternating layers of a metal and a dielectric material.

* * * * *